Oct. 16, 1945.   W. L. MORGAN   2,386,875

METHOD OF COATING WITH QUARTZ VAPOR

Filed Nov. 23, 1943

INVENTOR.
Willard L. Morgan.
BY Corbett, Mahoney Miller

ATTORNEYS

Patented Oct. 16, 1945

2,386,875

UNITED STATES PATENT OFFICE 2,386,875

METHOD OF COATING WITH QUARTZ VAPOR

Willard L. Morgan, Columbus, Ohio, assignor to Libbey-Owens-Ford Glass Company, Toledo, Ohio, a corporation of Ohio Application November 23, 1943, Serial No. 511,487

7 Claims. (Cl. 117—106)

This invention relates to a method of evaporating quartz. It has to do, more particularly, with the covering or coating of quartz with a suitable metallic silicate to permit controlled and uniform thermal evaporation of the quartz, resulting in its deposition upon the surface or face of an article of manufacture such, for example, as glass, plastic, reflectors, mirrors or other articles to produce a relatively thick and uniform protective coating layer on said surface.

Quartz is highly transparent and because of this and its known characteristic of extreme hardness, it provides a particularly desirable and satisfactory permanent protective coating or covering for the face or surface of a mirror or reflector, and prevents any danger of scratching or otherwise marring said surface.

Previous attempts to thermally evaporate quartz and apply it by deposition to surfaces, such as reflective surfaces, have not been satisfactory for the reason that quartz is extremely difficult to evaporate. Quartz must be heated beyond 1500° C. to vaporize and preferably to a white heat in the range of 1800° to 2000° centigrade. It is a known fact that quartz does not absorb heat by radiation and for this reason previous attempts to soften it and cause it to adhere to or wet a thermal heating element or filament have been unsatisfactory. In other words, quartz alone does not lend itself to evaporation by normal technique. In previous instances where attempts have been made to thermally evaporate and deposit the quartz upon a surface, only small quantities of the quartz could be evaporated and the process of deposition was slow and unsatisfactory and uniform surface coatings were not obtained.

I have discovered that by first mixing the quartz to be evaporated with some suitable metallic silicate, such for example as aluminum silicate, magnesium silicate, calcium silicate, or barium silicate, or by applying talc or other minerals containing these silicates as a surface coating or covering for the quartz, by a dusting or tumbling operation, the thermal evaporation thereof was materially enhanced and, moreover, that the coating of a surface, such as a reflective surface, by deposition thereupon of the particles or molecules of the evaporated quartz, could be satisfactorily controlled to produce a uniform protective coating.

It is, therefore, one of the objects of my present invention to provide an improved method or process whereby the thermal evaporation of quartz and its application, by deposition, as a coating or covering for surfaces can be achieved.

Another object of my invention is to provide an improved method or process whereby the evaporation of quartz can be controlled and speeded up to produce, by deposition, uniform and relatively thick and extremely hard protective surface coatings on the faces or surfaces of articles, such, for example, as glass or plastic, and the reflective or mirrored surfaces of pieces of glass.

Another object of my invention is to provide improved means or a method whereby the quartz may be preliminarily treated, covered, or coated with suitable material in a relatively simple and inexpensive manner to prepare the quartz for relatively rapid evaporation and dispersion when it is applied to an electrical thermal element, such as a tungsten filament.

In accordance with my present invention, quartz to be evaporated and deposited upon a surface is preferably first mixed with a quantity of any one or more of the silicates mentioned above to effect a covering or coating of the silicate over substantially the entire surface of the quartz. This coating or covering may be accomplished in various ways, such as by subjecting the pieces of quartz to a tumbling action in the presence of one of the foregoing silicates or talc in the form of powder. These coatings may afterwards be fused or sintered to the quartz by a preliminary heat treatment. The coated quartz, according to my present method, is then applied in a suitable manner to an electrically heated coil, such as a tungsten filament, which is energized to heat and melt the coating and in turn to heat the quartz, by permitting the wetting through good heat contact with the filament by the quartz. The coating also readily absorbs radiant heat, thus getting the heat into the quartz throughout. The temperature of the electric heating element or filament is maintained to thermally evaporate the quartz and cause its dispersion and deposition upon the surface or surfaces of an article to be coated. If desired, other materials than the silicates above mentioned may be employed for covering the quartz to be later thermally evaporated, such other materials being, for example, asbestine or white mica, both of which materials or substances are satisfactory for this purpose. With the quartz coated with any of these materials I can readily get the entire body of quartz heated and secure evaporation from all quartz surfaces, giving me a uniform evaporation in all directions and uniform deposits.

The foregoing and other objects and advantages of my invention will appear from the following description and appended claims when considered in connection with the accompanying drawing forming a part of this specification wherein like reference characters designate corresponding parts in the several views.

In said drawing:

Figure 7 is a perspective view, partly broken away, of a suitable apparatus for preforming the technique of evaporation of the precoated or covered quartz in accordance with the present invention and for effecting its deposition upon the surface of an article, such as the reflective or mirrored surface of a mirror, or the like.

Before explaining in detail the present invention it is to be understood that the invention is not limited in its application to the details of construction and arrangement of parts illustrated in the accompanying drawing, since the invention is capable of other embodiments and of being practiced and carried out in various ways. It is to be understood also that the phraseology or terminology employed herein is for the purpose of description and not of limitation, and it is not intended to limit the invention herein claimed beyond the requirements of the prior art.

Figure 1:
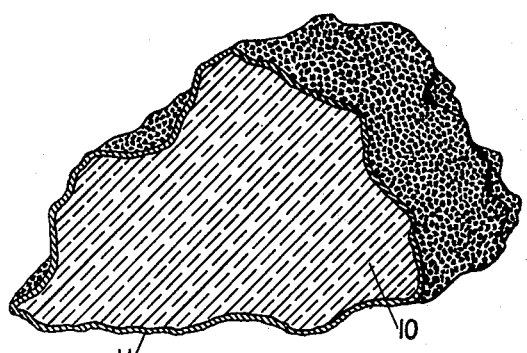
Figure 1 is a fragmentary perspective view, partly in section, showing a piece of precoated or covered quartz of irregular contour, in accordance with the present invention.
Figure 2:
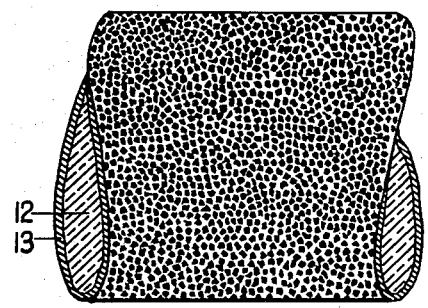
Figure 2 is a fragmentary perspective view, partly in section, showing a precoated round bar, rod, or stick of quartz, in accordance with my invention.

Referring now particularly to Figure 1 of the drawing, I have shown a lump or piece of quartz 10 of irregular contour or formation upon the surface of which there is provided a coating or covering 11 consisting of some suitable metallic silicate, or the like material. In Figure 2 there is shown a similarly coated round bar, rod or stick 12 of quartz in which the surface coating or covering is shown at 13.

It is to be understood that the coating or covering 11 or 13 may be applied to the surface of the quartz 10 or 12 in any suitable manner, such as by mixing, in a tumbling device or apparatus, the quartz with its covering or coating material which is in powdered form and which may be a metallic silicate, such as aluminum silicate, magnesium silicate, calcium silicate or barium silicate, or which may be, if desired, talc, asbestine or white mica. The coating or covering of silicate need not necessarily cover the entire surface area of the quartz but the particles of the covering material may be slightly spaced apart on the surfaces, as shown in exaggerated manner in Figures 1 and 2.

If desired, the quartz in either of its forms as shown at 10 and 12, may be subjected to a dusting action to apply the talc or other silicate to the surfaces thereof. One satisfactory manner of carrying out the dusting or coating of the quartz is to place the same, along with the coating or covering talc, etc., in a tumbling apparatus or device which is subjected to agitation to cause the talc to cover substantially all of the surface of the quartz. The tumbling device may be of any suitable and well known construction and, because of its conventional nature, I have not deemed it necessary to illustrate any such device or apparatus in the drawing accompanying this specification.

Figure 3:
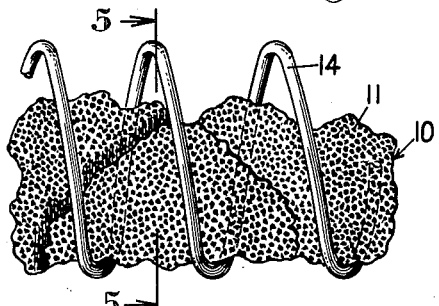
Figure 3 is an elevational view of a portion of an electric coil or filament shown supporting several irregular pieces of precoated or covered quartz, in accordance with my invention.
Figure 4:
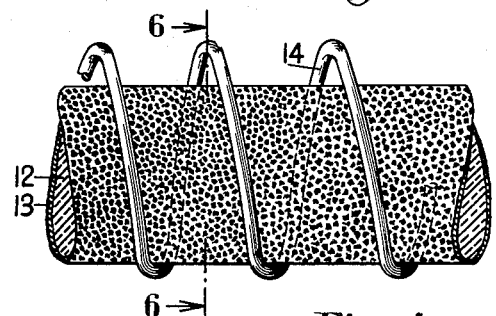
Figure 4 is a view similar to Figure 3 and showing a round bar or rod of precoated quartz similarly supported by an electric coil or filament.

After the quartz with its surface coating of metallic talc is removed from the tumbling or other suitable apparatus, it is preferably applied to and supported by the coils of an electric filament, such as the tungsten filament shown at 14 in Figure 3. As illustrated in this figure, three of the irregularly shaped pieces of quartz 10 with their surface coating 11 are placed within the coils of the filament 14 to be supported or suspended therein. If, however, the quartz is in the form of a round bar or stick, such as that shown at 12 with its surface coating 13, the coated bar is placed within the coils or convolutions of the filament 14 and supported thereby, as shown in Figure 4. I may, by preheating the powder-coated quartz in a furnace, sinter or fuse the powder coating before use in vacuum evaporation.

Figure 6:
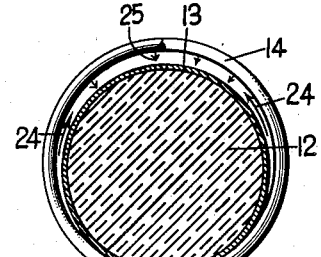
Figure 6 is a vertical sectional view taken substantially along the line 6—6 of Figure 4, looking in the direction of the arrows.
Figure 7:
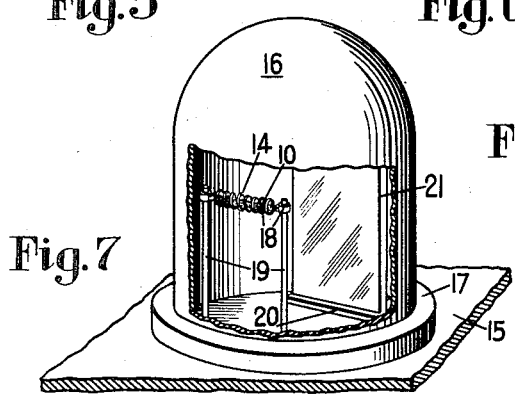

Referring now to Figure 7, I have shown suitable apparatus for effecting the thermal evaporation of the coated quartz. The apparatus, as shown, comprises a supporting base 15 upon which is mounted a housing or bell-like casing 16 having at its lower end a surrounding outward projection or flange 17 which rests upon the supporting base, the housing and base together providing a closed and sealed chamber. The electric coil or filament 14, shown in Figures 3 to 6, inclusive, is located within the housing 16 and is supported therein in substantially horizontal position by having its opposite ends attached to suitable supporting members or brackets 18 which are adjustably mounted upon upright posts or rods 19 carried by the base 15 of the apparatus.

Figure 5:
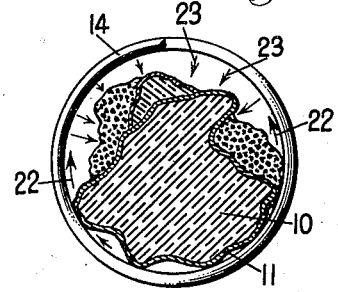
Figure 5 is a vertical sectional view taken substantially along the line 5—5 of Figure 3, looking in the direction of the arrows.

As shown, the base 15 is also provided with a supporting member 20 for supporting a mirror or reflector, shown as a whole at 21, in upright position within the chamber, the mirror being located opposite the coil or filament 14. As seen in Figure 7, pieces 10 of the coated quartz are supported by the coils or convolutions of the filament 14. The chamber of the apparatus is now preferably evacuated of air and a high vacuum of the order of 10 to the minus 5 millimeters created therein by means of suitable apparatus (not shown) for this purpose. The electric coil or filament 14 is now energized and thus heated whereupon the talc-coated quartz will tend to adhere to the filament and, in effect, wet or coat it since, by thus being subjected to heat, the silicate becomes a superficial molten phase. The heat from the filament 14, with which the pieces of talc-coated quartz are in actual physical contact throughout a portion of their surface area through the medium of the molten coating 11, is directly communicated to the quartz. Uncoated quartz is a poor heat conductor. As seen in Figure 5, the heat waves travel upwardly on the talc or molten silicate coating 11 generally in the direction of the arrows 22 to completely encircle the surface of the coated quartz. Radiant heat waves from those portions of the filament 14 with which the coated quartz is not actually in physical contact, are radiated from the filament generally in the direction of the arrows 23 to the heat radiation absorbing talc or silicate coating 11 and thence, by surface contact, directly to the quartz. Uncoated quartz does not absorb radiant heat to any large degree and is hence difficult to heat. However, with my silicate-coated quartz all portions or surfaces of the coated quartz are subjected to the heat, preventing any jittering of the quartz which occurred heretofore with all previously known methods where attempts were made to heat and thermally evaporate uncoated or untreated quartz. By virture of my improved method and by virtue of the metallic silicate, talc, asbestine or mica coating or covering for the quartz, the heating of the quartz is controlled and effectually accomplished.

Quartz must be heated to temperatures beyond 1500° C. to secure evaporation in a high vacuum. It is the inventor's belief that a mere heating of quartz in a tungsten electric resistance coil as in the past attempts to evaporate this material failed despite high heater wire temperatures by not actually heating any large part of the quartz to these high temperatures because of both the poor heat conductivity and poor radiant heat absorption by the quartz. Heating by convection currents is of course absent in a vacuum and the quartz which does not melt becomes heated only at the immediate point at which it contacts the tungsten wire. This wire may easily be above 3500° C. without the main body of the quartz being heated to a sufficiently high temperature such as 1800° to 2000° C. to evaporate. The localization of the heating with ordinary quartz is shown by a peculiar phenomenon in that on close observation the quartz pieces are found not to remain at rest and in contact with the heater wires but to actually dance on the same. Thus, the localized areas in contact with the heater wire are raised sufficiently in temperature to vaporize some quartz and the pressure of such vapor at this spot, which exists only on the heater contacting side of the piece, is sufficient to lift the piece away from the wire. This breaks the thermal contact and the quartz piece immediately cools and stops evaporating and as the vapor pressure disappears the piece again falls onto the wire. Thus, the only means of getting heat into the clear non-radiant heat absorbing quartz is by a localized thermal contact which is constantly broken. In the case of heating a rod of uncoated quartz, the quartz continuously bounds around inside the coil as it is blown away from contact and on hitting on the other side and making thermal contact it again bounces back off. It can be seen that as thermal conduction is poor in the quartz most of the surface of the quartz (and the inside of the particles) do not get sufficiently hot to become evaporating surfaces and hence there is no uniformity of evaporation in all directions into the apparatus, the evaporation secured being sporadic and undependable, and relatively small in quantity.

I have overcome these difficulties and get my quartz uniformly and highly heated throughout so that all surfaces of quartz become evaporating surfaces by applying a metallic silicate which absorbs radiant heat, which conducts heat around the particles, and which gives a superficial molten phase which increases the heating also through better thermal contact. I can thus rapidly evaporate relatively large quantities of quartz in a short time and uniformly in all directions.

Referring now particularly to Figure 6 of the drawing, it will be noted that the heat waves travel upwardly on the metallic talc coating 13 generally in the direction of the arrows 24 to completely encircle the surface of the coated quartz rod or bar 12. Other heat waves from those portions of the filament 14 with which the talc-coated quartz 12 is not actually in physical contact, are radiated from the upper portion of the coils or convolutions of the filament generally in the direction of the arrows 25 to the metallic talc coating 13 and thence, by surface contact, directly to the quartz piece 12. As described in connection with Figure 5 of the drawing, all portions or surfaces of the coated quartz piece 12 are subjected to the heat from the filament 14 through the medium of the coating 13, thus preventing any jittering of the quartz and effecting the even heating of the quartz to cause its tendency to wet or coat the filament 14.

The maintenance of a high degree of heat on the coil or filament 14 will now cause the thermal evaporation of the quartz supported by the filament and the particles or molecules thereof will be dispersed and deposited upon the reflective face or surface of the mirror or reflector 21 located within the apparatus to produce on said reflective surface a protective coating or layer of quartz which is uniform and relatively thick.

Figure 8:
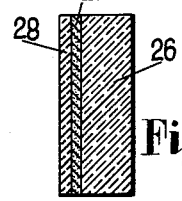
Figure 8 is an end elevational or edge view of a mirror or reflector having a surface protective coating or layer of quartz produced in accordance with my present method or process.

In Figure 8 I have shown a finished product or article produced in accordance with my invention. In this figure, the article, for example a mirror or reflector shown as a whole at 21, has a backing or base 26, preferably formed from glass, a reflective or mirrored surface or face 27, and a relatively thick and uniform protective surface coating or layer 28 of quartz. It is to be noted particularly that the quartz protective coating or layer 28 is relatively thick and uniform so as to provide a permanent protective coating or surface for the mirror or reflector to prevent any danger of marring of the mirrored or reflective surface by scratching, or otherwise.

Figure 9:
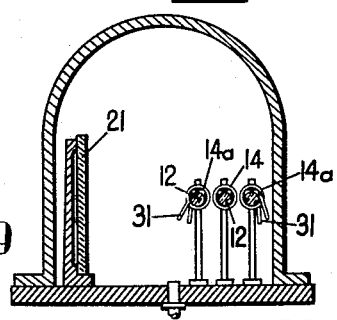
Figure 9 is a vertical sectional view of an apparatus similar to that shown in Figure 7 wherein a plurality of electrically heated resistance coils are provided.

My new process of evaporating quartz may also be carried out in a bell jar 30 containing several tungsten electrically heated resistance coils 14, 14a, as shown in Figure 9. In some of these coils, quartz rods 12, which had previously been tumbled with finely ground talc 13 and thereby coated with the same, were placed. The coated quartz weighed a total of 2.9 grams, having a total volume slightly more than 1.0 cc. On other tungsten heater coils 14 there were placed pieces of chromium 31 weighing 3.5 grams with a volume of 0.5 cc. A glass sheet 21 was placed in the chamber 24 inches away from the heater coils and the vacuum reduced to 0.00001 mm. by the use of high vacuum pumps (not shown) attached to the chamber. By applying electric current to the tungsten coils 14a carrying the chromium 31, this material was evaporated onto the glass 21 and after its evaporation was completed the talc-coated quartz was then evaporated by applying an electric current to the coil 14 carrying the same. The chromium mirror produced carried 0.070 gram of chromium as a uniform coating on each square foot of glass and protecting this was a layer of quartz weighing 0.054 gram. The chromium coating was approximately 0.000110 mm. thick and the quartz layer was approximately 0.000220 mm. thick.

Proceeding as above, I evaporated the same amount of chromium and thereafter evaporated 0.29 gram of quartz which had been previously dusted and coated with aluminum silicate. This gave me a mirror in which the aluminum coating was approximately 0.000110 mm. thick and in which the protective quartz coating thereon was approximately 0.000022 mm. thick.

Using a high vacuum evaporation chamber as already described in connection with Figure 9, I applied to several tungsten electrically heated resistance coils 0.75 gram of silver of 0.071 cc. volume. Onto other tungsten resistance coils I applied slightly more than 0.57 gram of quartz which had been previously tumbled in and dusted and thereby coated with either magnesium silicate, aluminum silicate, talc, asbestine or mica, each in finely powdered form. The silver was evaporated after reducing the vacuum to 0.00001 mm., giving on glass which was placed 12 inches away a coating of high mirror quality which was approximately 0.000060 thick. The coated quartz was next evaporated by energizing the tungsten resistance coils with heavy electric current and this evaporated onto the silver mirror readily and gave a uniform coating approximately three times as thick as the silver coating. This coating gave a high degree of protection to the silver mirror from scratching and from alteration by chemical attack from sulfur gases and other chemicals.

From the foregoing it will be seen that I have provided improved means or a method of evaporating quartz by precoating or covering the same with some suitable metallic silicate, such as those mentioned specifically above, to aid in the wetting of an energized filament, such as a tungsten filament, to which the precoated or covered quartz is applied, and by said method have also effected the uniform evaporation and control of the quartz thus giving absorption of radiant heat into the quartz so that it is heated throughout evaporation to produce, by deposition, a protective coating or layer of quartz on the reflective face or surface of an article, such as a mirror or reflector. Moreover, by providing the quartz with a coating or surface covering of metallic silicate prior to the evaporation step of the process, I have caused a uniform heating of the quartz through improved physical contact with the heated filament by surface contact through the medium of the molten silicate coating or covering on the quartz.

Having thus described my invention, what I claim is:

1. The method of coating surfaces with quartz by evaporation technique within a vacuum, comprising coating substantially the entire surface of the quartz with a metallic silicate, positioning the quartz and attached metallic silicate within an electrically heated filament in a high vacuum to heat the quartz to a high temeprature and to evaporate said quartz, and depositing the quartz on a support surface.

2. The method of coating a reflective mirror surface with quartz by evaporation technique within a vacuum, comprising coating substantially the entire surface of the quartz with a metallic silicate, positioning the quartz and attached metallic silicate within a heat radiating tungsten filament in a high vacuum to heat the quartz to a high temperature and to evaporate said quartz, and depositing the quartz on a reflective mirror surface.

3. A method according to claim 1 wherein the temperature is raised above 1500° C.

4. A method according to claim 1 wherein the metallic silicate is a natural metallic silicate.

5. A method according to claim 1 wherein the metallic silicate is aluminum silicate.

6. A method according to claim 1 wherein the metallic silicate is magnesium silicate.

7. A method according to claim 1 wherein the silicate is calcium silicate.

WILLARD L. MORGAN.